United States Patent
Mayhew

(10) Patent No.: US 12,060,934 B1
(45) Date of Patent: Aug. 13, 2024

(54) TECHNIQUES TO DISCRIMINATE VEHICLE PROPULSION SYSTEM TORQUE ERRORS

(71) Applicant: FCA US LLC, Auburn Hills, MI (US)

(72) Inventor: William R Mayhew, Ann Arbor, MI (US)

(73) Assignee: FCA US LLC, Auburn Hills, MI (US)

(*) Notice: Subject to any disclaimer, the term of this patent is extended or adjusted under 35 U.S.C. 154(b) by 0 days.

(21) Appl. No.: 18/498,299

(22) Filed: Oct. 31, 2023

(51) Int. Cl.
*F16H 61/04* (2006.01)
*F16H 61/12* (2010.01)

(52) U.S. Cl.
CPC . *F16H 61/0403* (2013.01); *F16H 2061/0407* (2013.01); *F16H 2061/0422* (2013.01); *F16H 2061/124* (2013.01); *F16H 2306/48* (2013.01)

(58) Field of Classification Search
CPC ......... F16H 61/0403; F16H 2061/0407; F16H 2061/0422; F16H 2061/124; F16H 2306/48
See application file for complete search history.

(56) References Cited

U.S. PATENT DOCUMENTS

| | | | |
|---|---|---|---|
| 8,109,857 B2 | 2/2012 | Roses et al. | |
| 9,566,977 B2 | 2/2017 | Gibson et al. | |
| 10,343,678 B2 | 7/2019 | Pietron et al. | |
| 10,457,286 B1 * | 10/2019 | Mayhew | B60W 10/06 |
| 2005/0101435 A1 * | 5/2005 | Cowan | B60W 10/11 477/83 |
| 2006/0223671 A1 | 10/2006 | Steen et al. | |
| 2023/0279936 A1 * | 9/2023 | Dalla Palma | F16H 61/0403 475/24 |

FOREIGN PATENT DOCUMENTS

EP   2177781 A2   4/2010

* cited by examiner

*Primary Examiner* — Justin Holmes
(74) *Attorney, Agent, or Firm* — Jeremy J. Klobucar

(57) ABSTRACT

Control systems and methods for a vehicle transmission initiate a shift operation of the transmission and, during the transmission shift operation, determine an acceleration of a torque generating system output shaft based on its measured rotational speed and determine an acceleration of the transmission output shaft based on its measured rotational speed, identify an error source using a transmission model that maps differences between the determined and target accelerations back to torque generating system error and/or transmission clutch torque error and, based on the identified error source, adjust the actuation of at least some of the plurality of clutches to compensate for the torque generating system error and/or transmission clutch torque error to mitigate or eliminate noise/vibration/harshness (NVH) caused by the transmission shift operation.

14 Claims, 2 Drawing Sheets

TECHNIQUES TO DISCRIMINATE VEHICLE PROPULSION SYSTEM TORQUE ERRORS

FIELD

The present application generally relates to vehicle propulsion systems and, more particularly, to techniques to discriminate vehicle propulsion system torque errors.

BACKGROUND

A vehicle includes a propulsion system or powertrain that generates and transfers drive torque to a driveline for vehicle propulsion. Specifically, the propulsion system includes a torque generating system (e.g., an internal combustion, one or more electric motors, or some combination thereof) that generates torque and a transmission (e.g., a multi-speed automatic transmission) that transfers the torque to the driveline. The transmission includes a plurality of different gears from which a particular gear is selected by hydraulically actuating one or more clutches of the transmission. A transmission shift generally involves simultaneous control of engine/motor torque and transmission clutch torque/pressure. Conventional transmission control systems assume that errors are due to clutch torque and thus only adapt clutch torque/pressure, but the engine/motor torque could also be the source of the error. Accordingly, while such conventional vehicle transmission control systems do work well for their intended purpose, there exists an opportunity for improvement in the relevant art.

SUMMARY

According to one example aspect of the invention, a control system for a transmission of a vehicle is presented. In one exemplary implementation, the control system comprises a first output shaft speed sensor configured to measure a rotational speed of an output shaft of a torque generating system of the vehicle, the output shaft of the torque generating system being coupled to an input shaft of the transmission, a second output shaft speed sensor configured to measure a rotational speed of an output shaft of the transmission, the transmission including a plurality of gears and a plurality of hydraulically-actuated clutches, and a controller configured to initiate a shift operation of the transmission where at least some of the plurality of clutches are actuated to disengage a current gear and to engage a new desired gear of the plurality of transmission gears and, during the transmission shift operation determine accelerations of (i) the torque generating system output shaft and (ii) the transmission output shaft based on the respective measured rotational speeds, identify an error source using a transmission model that maps differences between the determined and target accelerations back to torque generating system error and/or transmission clutch torque error, and based on the identified error source, adjust the actuation of at least some of the plurality of clutches to compensate for the torque generating system error and/or transmission clutch torque error to mitigate or eliminate noise/vibration/harshness (NVH) caused by the transmission shift operation.

In some implementations, the transmission model defines linear algebra that relates determined acceleration error back to the torque generating system and/or one or more of the plurality of transmission clutches. In some implementations, the transmission model is based on a simple planetary gearset with fixed gear plane connections and a set of speed constraints. In some implementations, wherein the transmission model defines the following to discriminate between torque generating system error ($\Delta \tau_{IN}$) and transmission clutch torque error ($\Delta \tau_C$):

$$\begin{bmatrix} \Delta \tau_{IN} \\ \Delta \tau_C \end{bmatrix} = \begin{bmatrix} \frac{\partial a_{IN}}{\partial \tau_{IN}} & \frac{\partial a_{IN}}{\partial \tau_C} \\ \frac{\partial a_{OUT}}{\partial \tau_{IN}} & \frac{\partial a_{OUT}}{\partial \tau_C} \end{bmatrix}^{-1} \cdot \begin{bmatrix} \Delta a_{IN} \\ \Delta a_{OUT} \end{bmatrix},$$

where $a_{IN}$ and $a_{OUT}$ are the transmission input/output shaft accelerations.

In some implementations, the controller is configured to determine the accelerations using third-order Kalman filtering of the measured rotational speeds of (i) the torque generating system output shaft and (ii) the transmission output shaft. In some implementations, the determined accelerations $a_{IN}^*$ and $a_{OUT}^*$ are defined as follows:

$$a_{IN}^* = \frac{\partial a_{IN}}{\partial \tau_{IN}} \cdot \tau_{IN}^* + \frac{\partial a_{IN}}{\partial \tau_C} \cdot \tau_C^* + \frac{\partial a_{IN}}{\partial \tau_{OUT}} \cdot \tau_{OUT}^*, \text{ and}$$

$$a_{OUT}^* = \frac{\partial a_{OUT}}{\partial \tau_{IN}} \cdot \tau_{IN}^* + \frac{\partial a_{OUT}}{\partial \tau_C} \cdot \tau_C^* + \frac{\partial a_{OUT}}{\partial \tau_{OUT}} \cdot \tau_{OUT}^*.$$

In some implementations, the controller does not assume that the error source is the transmission and incorrectly adjust clutch torque/pressure in response thereto.

According to another example aspect of the invention, a control method for a transmission of a vehicle is presented. In one exemplary implementation, the control method comprises initiating, by a controller of the transmission of the vehicle, a shift operation of the transmission where at least some of a plurality of clutches of the transmission are actuated to disengage a current gear of a plurality of gears of the transmission and to engage a new desired gear of the plurality of gears during the transmission shift operation, determining, by the controller and using a first speed sensor, an acceleration of an output shaft of a torque generating system that is coupled to an input shaft of the transmission based on a measured rotational speed of the torque generating system output shaft by the first speed sensor, determining, by the controller and using a second speed sensor, an acceleration of an output shaft of the transmission based on a measured rotational speed of the transmission output shaft by the second speed sensor, identifying, by the controller, an error source using a transmission model that maps differences between the determined and target accelerations back to torque generating system error and/or transmission clutch torque error, and based on the identified error source, adjusting, by the controller, the actuation of at least some of the plurality of clutches to compensate for the torque generating system error and/or transmission clutch torque error to mitigate or eliminate NVH caused by the transmission shift operation.

In some implementations, the transmission model defines linear algebra that relates determined acceleration error back to the torque generating system and/or one or more of the plurality of transmission clutches. In some implementations, the transmission model is based on a simple planetary gearset with fixed gear plane connections and a set of speed constraints. In some implementations, the transmission model defines the following to discriminate between torque generating system error ($\Delta \tau_{IN}$) and transmission clutch torque error ($\Delta \tau_C$):

$$\begin{bmatrix} \Delta \tau_{IN} \\ \Delta \tau_C \end{bmatrix} = \begin{bmatrix} \frac{\partial a_{IN}}{\partial \tau_{IN}} & \frac{\partial a_{IN}}{\partial \tau_C} \\ \frac{\partial a_{OUT}}{\partial \tau_{IN}} & \frac{\partial a_{OUT}}{\partial \tau_C} \end{bmatrix}^{-1} \cdot \begin{bmatrix} \Delta a_{IN} \\ \Delta a_{OUT} \end{bmatrix},$$

where $a_{IN}$ and $a_{OUT}$ are the transmission input/output shaft accelerations.

In some implementations, determining the accelerations comprises determining, by the controller, the accelerations using third-order Kalman filtering of the measured rotational speeds of (i) the torque generating system output shaft and (ii) the transmission output shaft. In some implementations, the determined accelerations $a_{IN}^*$ and $a_{OUT}^*$ are defined as follows:

$$a_{IN}^* = \frac{\partial a_{IN}}{\partial \tau_{IN}} \cdot \tau_{IN}^* + \frac{\partial a_{IN}}{\partial \tau_C} \cdot \tau_C^* + \frac{\partial a_{IN}}{\partial \tau_{OUT}} \cdot \tau_{OUT}^*,$$

$$\text{and } a_{OUT}^* = \frac{\partial a_{OUT}}{\partial \tau_{IN}} \cdot \tau_{IN}^* + \frac{\partial a_{OUT}}{\partial \tau_C} \cdot \tau_C^* + \frac{\partial a_{OUT}}{\partial \tau_{OUT}} \cdot \tau_{OUT}^*.$$

In some implementations, the controller does not assume that the error source is the transmission and incorrectly adjust clutch torque/pressure in response thereto.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

As previously discussed, conventional transmission control systems assume that errors are due to clutch torque and thus only adapt clutch torque/pressure, but the engine/motor torque could also be the source of the error. Thus, if the engine/motor torque is incorrect (i.e., the error), adaptation of the clutch torque will lead to a shift that is worse instead of better because the wrong parameter is being adjusted. Thus, while such conventional vehicle transmission control systems do work for their intended purpose, there exists an opportunity for improvement in the relevant art. Accordingly, improved techniques to discriminate vehicle propulsion system torque errors are presented herein. More specifically, these techniques are capable of discriminating between engine/motor torque and clutch torque errors, which today's conventional techniques cannot. These techniques use a more complete understanding of transmission physics (i.e., a more complex mathematical model) and a pair of acceleration targets (transmission input/output) and the resulting pair of acceleration errors can be mapped (e.g., via linear algebra or matrix math) back to the pair of torque actuators. The potential benefits of these techniques include improved shift quality and improved customer satisfaction.

Figure 1:
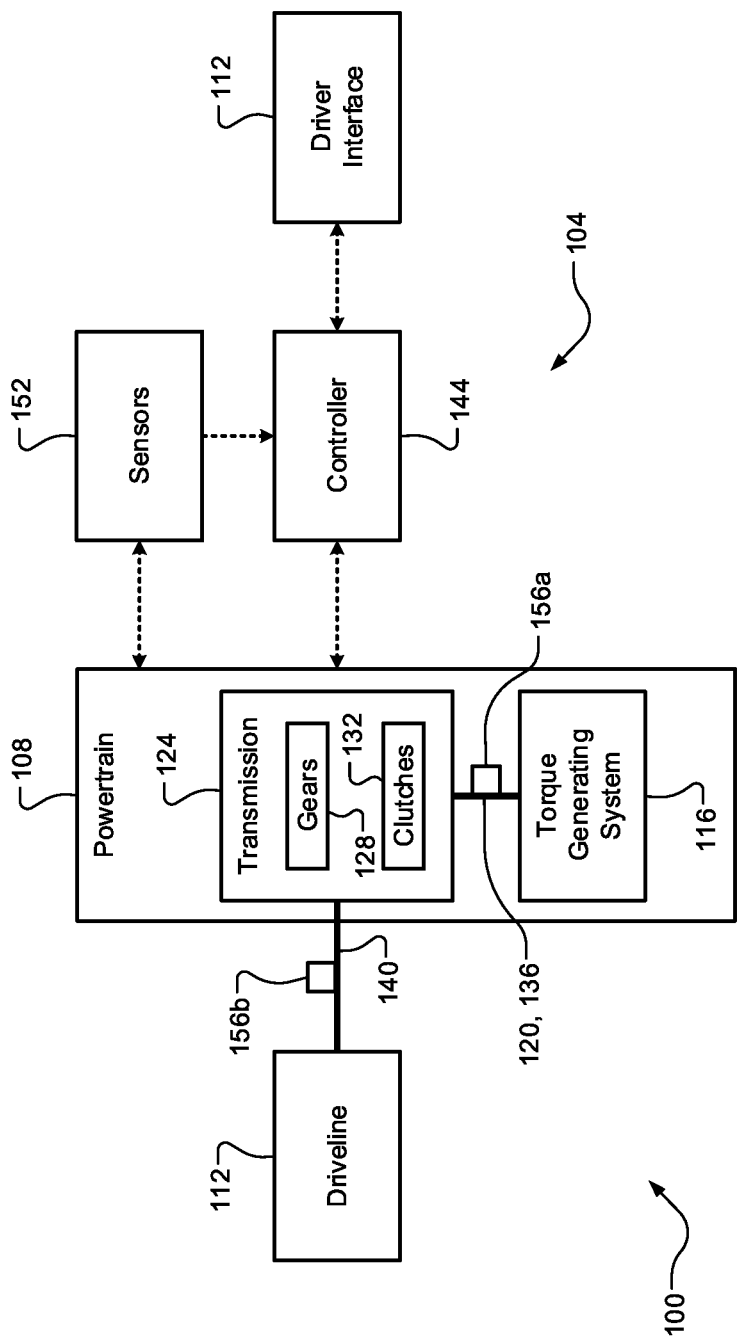
FIG. 1 is a functional block diagram of a vehicle having an example transmission control system according to the principles of the present application.

Referring now to FIG. 1, a functional block diagram of a vehicle 100 having an example transmission control system 104 according to the principles of the present application is illustrated. The vehicle 100 includes a powertrain or propulsion system 108 that generates and transfers drive torque to a driveline 112 for vehicle propulsion. The propulsion system 108 includes a torque generating system 116, which could be an internal combustion engine, one or more electric motors, or some combination thereof (e.g., a hybrid configuration). For purposes of the present application, it will be assumed that the torque generating system 116 generates drive torque at a single output shaft 120 (e.g., an engine crankshaft), noting that this could be different depending on the exact configuration of the torque generating system 116. The propulsion system 108 also includes a transmission 124 (e.g., a multi-speed automatic transmission) that includes a plurality of gears 128 and a plurality of clutches 132. The clutches 132 are hydraulically actuated to engage a desired gear 128 for multiplying torque from an input shaft 136 to an output shaft 140 of the transmission 124. The vehicle 100 also includes a controller 144 for controlling operation of the vehicle 100 and, more particularly, for controlling the propulsion system 108 to generate and transfer a desired amount of drive torque to the driveline 112 to satisfy a torque request, which could be provided by a driver of the vehicle 100 via a driver interface 148 (e.g., an accelerator pedal).

While a single controller 144 is illustrated, it will be appreciated that the vehicle 100 could include a plurality of independent controllers or control units that collectively operate together to control the vehicle 100. For example, the controller 144 could be divided into a powertrain or engine control unit (ECU) or a hybrid control processor (HCP) and a transmission control module (TCM) that is dedicated to controlling the transmission 124. The vehicle 100 also includes a plurality of sensors 152, including at least two independent speed sensors 156a and 156b for measuring rotational speeds or accelerations of shafts 120 and 140, respectively. The sensors 152 are also configured to measure other suitable operating parameters of the vehicle 100, including, but not limited to, temperatures (ambient temperature, clutch temperature, coolant temperature, etc.), other shaft speeds/accelerations, pressures (e.g., transmission hydraulic pressure), and the like. It will be appreciated that the vehicle 100 could also include other non-illustrated components, such as a fluid coupling or torque converter disposed between the torque generating system 116 and the transmission 124. The controller 144 is also configured to perform at least a portion of the techniques of the present application, which will be discussed more fully below.

Given a more complete mathematical model and a pair of acceleration targets (e.g., transmission input and output), the resulting pair of acceleration errors can be mapped by linear algebra or matrix math back to the pair of torque actuators. Thus, the techniques of the present application use a more complete understanding of transmission physics to correctly identify shift control error sources, which, when corrected, will result in improved shift quality and customer satisfaction. First, a detailed transmission model is derived. For a simple planetary gearset having sun (SUN or S) and ring (RING or R) gears and a planet (PLANET or P) gear(s)

having a carrier (CARRIER or C), the point of contact between the sun gear and the planet gear has the same position, velocity, and acceleration regardless of the frame of reference being the sun gear or the planet gear and, assuming only circular motion, is as follows:

$$(r \cdot \alpha)_{SUN} = (r \cdot \alpha)_{CARRIER} - (r \cdot \alpha)_{PLANET} \quad (1),$$

where r is rotational force and $\alpha$ is angular acceleration.

Similarly, the point of contact between the planet gear and the ring gear is as follows:

$$(r \cdot \alpha) RING = (r \cdot \alpha)_{CARRIER} - (r \cdot \alpha)_{PLANET} \quad (2).$$

Placing these constraints into a compact matrix formulation results in the following:

$$\begin{bmatrix} r_S & r_P & -r_C & 0 \\ 0 & -r_P & -r_C & r_R \end{bmatrix} \cdot \begin{bmatrix} \alpha_S \\ \alpha_P \\ \alpha_C \\ \alpha_R \end{bmatrix} = \begin{bmatrix} 0 \\ 0 \\ 0 \\ 0 \end{bmatrix} \equiv \vec{S}_G \cdot \vec{\alpha} = \vec{0}. \quad (3)$$

Given fixed connections between multiple gear planes, e.g., in a Simpson design (i.e., sun-to sun connection and ring-to-carrier connection), additional speed constraints $\vec{S}$ apply as shown below:

$$\vec{S} \equiv \begin{bmatrix} 1 & 0 & 0 & 0 & -1 & 0 & 0 & 0 \\ 0 & 0 & 1 & 0 & 0 & 0 & 0 & -1 \end{bmatrix} \cdot [\vec{\alpha}_1 \ \vec{\alpha}_2]^T. \quad (4)$$

In a one-dimensional (1D) torsional analysis, the gear components above each have an acceleration proportional to a torques ($\tau$) sum as follows:

$$-r_S \times F_{S:P} - \tau_S = (J \cdot \alpha)_S$$

$$-r_P \times F_{S:P} + r_P \times F_{R:P} = (J \cdot \alpha)_P$$

$$r_C \times F_{S:P} + r_C \times F_{R:P} - \tau_C = (J \cdot \alpha)_C$$

$$-r_R \times F_{R:P} - \tau_R = (J \cdot \alpha)_R \quad (5),$$

where F represents force and J represents impulse. Placing these torque-acceleration balances into a matrix form results in the following:

$$\begin{bmatrix} J_S & 0 & 0 & 0 & r_S & 0 \\ 0 & J_P & 0 & 0 & r_P & -r_P \\ 0 & 0 & J_C & 0 & -r_C & -r_C \\ 0 & 0 & 0 & J_R & 0 & r_R \end{bmatrix} \cdot \begin{bmatrix} \alpha_s \\ \alpha_P \\ \alpha_C \\ \alpha_R \\ F_{S:P} \\ F_{P:R} \end{bmatrix} = \begin{bmatrix} 1 & 0 & 0 & 0 \\ 0 & 0 & 0 & 0 \\ 0 & 0 & 1 & 0 \\ 0 & 0 & 0 & 1 \end{bmatrix} \begin{bmatrix} \tau_S \\ 0 \\ \tau_C \\ \tau_R \end{bmatrix}. \quad (6)$$

Clutching actions add both speed constraints and torques. Recognizing the transpose of the speed constraints (e.g., for gear mesh as well as clutch synchronization) appears in the torque-acceleration balance and produces a compact set of equations as follows:

$$[\mathcal{J} \ \vec{S}^T \ \vec{C}^T] \cdot \begin{bmatrix} \vec{\alpha} \\ \vec{F} \\ \vec{\tau}_H \end{bmatrix} = \vec{X} \cdot \vec{\tau}_X. \quad (7)$$

Defining a clutched system matrix $\vec{G}(\vec{c})$, which is square, symmetric, and constant, we obtain the following:

$$\vec{G}(\vec{c}) \equiv \begin{bmatrix} \mathcal{J} & \vec{S}^T & \vec{C}^T \\ \vec{S} & \vec{0} & \vec{0} \\ \vec{C} & \vec{0} & \vec{0} \end{bmatrix}. \quad (8)$$

The above produces a solution for node accelerations, gear tooth contact forces $\vec{C}$, and holding clutch torques $\vec{\tau}_H$ as a function of external torques, e.g. input and output load and a controlled clutch torque. Here, the external torques are split into loads (e.g., engine/motor torque) $\vec{\tau}_X$ and controlled clutch torques $\vec{\tau}_C$ as follows:

$$\begin{bmatrix} \vec{\alpha} \\ \vec{F} \\ \vec{\tau}_H \end{bmatrix} = [\vec{G}(\vec{c})]^{-1} \cdot [\vec{X}] \begin{bmatrix} \vec{\tau}_X \\ \vec{\tau}_C \end{bmatrix}. \quad (9)$$

Assuming input and output speeds are visible from speed sensors and are of interest for control, their values are given above as a linear combination of torques.

The following accelerations a are assumed to be target values, for a theoretically perfect set of applied torques, with $\tau_{IN}$ representing transmission input torque, $\tau_C$ representing transmission clutch torque, and $\tau_{OUT}$ representing transmission output torque.

$$a_{IN} = \frac{\partial a_{IN}}{\partial \tau_{IN}} \cdot \tau_{IN} + \frac{\partial a_{IN}}{\partial \tau_C} \cdot \tau_C + \frac{\partial a_{IN}}{\partial \tau_{OUT}} \cdot \tau_{OUT} \ a_{OUT} = \quad (10)$$

$$\frac{\partial a_{OUT}}{\partial \tau_{IN}} \cdot \tau_{IN} + \frac{\partial a_{OUT}}{\partial \tau_C} \cdot \tau_C + \frac{\partial a_{OUT}}{\partial \tau_{OUT}} \cdot \tau_{OUT}.$$

Given measured accelerations indicated by the * notation (e.g. via 3$^{rd}$ order Kalman filtering of measured speeds), the following is obtained:

$$a_{IN}^* = \frac{\partial a_{IN}}{\partial \tau_{IN}} \cdot \tau_{IN}^* + \frac{\partial a_{IN}}{\partial \tau_C} \cdot \tau_C^* + \frac{\partial a_{IN}}{\partial \tau_{OUT}} \cdot \tau_{OUT}^* \ a_{OUT}^* = \quad (11)$$

$$\frac{\partial a_{OUT}}{\partial \tau_{IN}} \cdot \tau_{IN}^* + \frac{\partial a_{OUT}}{\partial \tau_C} \cdot \tau_C^* + \frac{\partial a_{OUT}}{\partial \tau_{OUT}} \cdot \tau_{OUT}^*.$$

The error between the targets and the measurements is as follows:

$$a_{IN} - a_{IN}^* = \frac{\partial a_{IN}}{\partial \tau_{IN}} \cdot (\tau_{IN} - \tau_{IN}^*) + \quad (12)$$

$$\frac{\partial a_{IN}}{\partial \tau_C} \cdot (\tau_C - \tau_C^*) + \frac{\partial a_{IN}}{\partial \tau_{OUT}} \cdot (\tau_{OUT} - \tau_{OUT}^*) a_{OUT} - a_{OUT}^* =$$

$$\frac{\partial a_{OUT}}{\partial \tau_{IN}} \cdot (\tau_{IN} - \tau_{IN}^*) + \frac{\partial a_{OUT}}{\partial \tau_C} \cdot (\tau_C - \tau_C^*) + \frac{\partial a_{OUT}}{\partial \tau_{OUT}} \cdot (\tau_{OUT} - \tau_{OUT}^*).$$

Finally, a solution to discriminate any two torque errors can be derived as shown below. In this case, engine/motor output torque and clutch torque are chosen as the input/output error sources.

$$\Delta a_{IN} = \frac{\partial a_{IN}}{\partial \tau_{IN}} \cdot \Delta \tau_{IN} + \frac{\partial a_{IN}}{\partial \tau_C} \cdot \Delta \tau_C \quad (13)$$
$$\Delta a_{IN} = \frac{\partial a_{OUT}}{\partial \tau_{IN}} \cdot \Delta \tau_{IN} + \frac{\partial a_{OUT}}{\partial \tau_C} \cdot \Delta \tau_C \Rightarrow$$

$$\begin{bmatrix} \Delta a_{IN} \\ \Delta a_{OUT} \end{bmatrix} = \begin{bmatrix} \frac{\partial a_{IN}}{\partial \tau_{IN}} & \frac{\partial a_{IN}}{\partial \tau_C} \\ \frac{\partial a_{OUT}}{\partial \tau_{IN}} & \frac{\partial a_{OUT}}{\partial \tau_C} \end{bmatrix} \cdot \begin{bmatrix} \Delta \tau_{IN} \\ \Delta \tau_C \end{bmatrix} \Rightarrow \begin{bmatrix} \Delta \tau_{IN} \\ \Delta \tau_C \end{bmatrix} =$$

$$\begin{bmatrix} \frac{\partial a_{IN}}{\partial \tau_{IN}} & \frac{\partial a_{IN}}{\partial \tau_C} \\ \frac{\partial a_{OUT}}{\partial \tau_{IN}} & \frac{\partial a_{OUT}}{\partial \tau_C} \end{bmatrix}^{-1} \cdot \begin{bmatrix} \Delta a_{IN} \\ \Delta a_{OUT} \end{bmatrix}.$$

Given an additional speed sensors, additional errors could be quantified. It will also be appreciated that these techniques are applicable to any vehicle propulsion system having two or more torque actuators and an equal or greater number of appropriate independent speed sensors. The controller 144 is able to utilize the above solution (12) to derive torque errors and thereby discriminate between actual transmission clutch torque errors (as conventionally assumed) and other torque errors at the engine/motor. By being able to recognize torque errors due to the engine/motor, the controller 144 is able to then not incorrectly adjust clutch torque/pressure and instead could be able to control the transmission 124 (e.g., clutch torque/pressure) to compensate for the engine/motor torque error, thereby resulting in smoother shifting performance and an improved customer experience.

While the example described above includes two torque actuators (i.e., engine/motor torque transmission clutch torque), it will be appreciated that the techniques of the present application could be extended to discriminate between torque errors from three or more different sources or different torque actuators. For example, some electrified or hybrid powertrains include an internal combustion engine with an automatic transmission and one or more electric motors in addition thereto. In one exemplary implementation, a first vehicle axle could be associated with an engine/transmission and a first electric motor (e.g., configured to assist or drive the engine, such as a belt-driven starter-generator (BSG) unit) and a different second vehicle axle could be associated with a second electric motor. The above-described linear algebra or matrix math could be extended to three or more torque actuators by increasing the sizes of the respective matrices, which effectively stack on top of each other. The underlying mathematical derivations, however, remains the same even for the case of three or more torque actuators and larger matrices.

Figure 2:
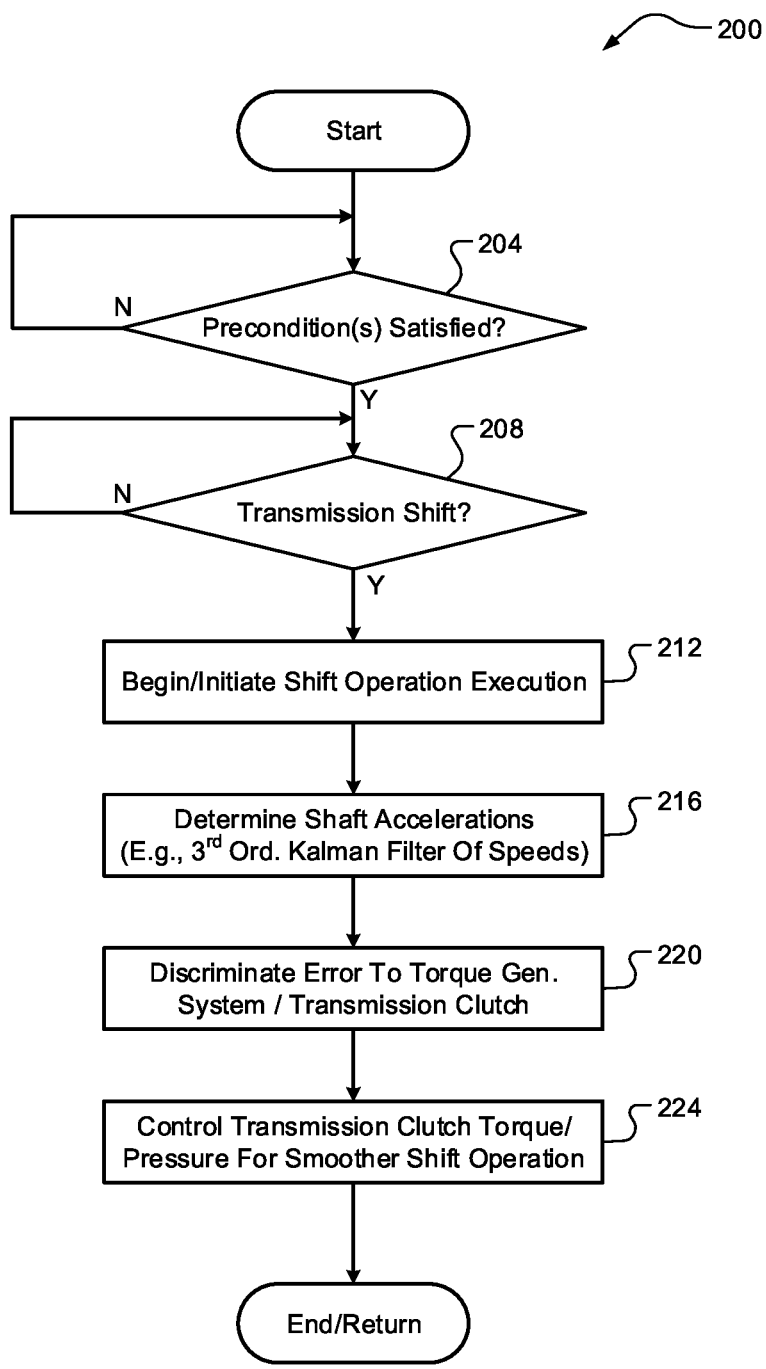
FIG. 2 is a flow diagram of an example transmission control method to discriminate between engine/motor torque errors and transmission clutch torque errors according to the principles of the present application.

Referring now to FIG. 2, a flow diagram of an example method 200 to discriminate vehicle propulsion system torque errors according to the principles of the present application is illustrated. While the vehicle 100 and its components are specifically referenced for illustrative/descriptive purposes, it will be appreciated that the method 200 could be applicable to any suitably configured vehicle. At 204, the controller 144 determines whether an optional set of one or more preconditions are satisfied. The one or more preconditions could include, for example only, the vehicle 100 being in a desired state (e.g., powered up or running and in a desired gear) and/or there being no malfunctions present that would otherwise affect the operation of the vehicle 100 or the techniques of the present application. When false, the methods 200 ends or returns to 204. When true, the method 200 continues to 208. At 208, the controller 144 determines whether a shift operation of the transmission 124 is required. When false, the method 200 ends or returns to 208. When true, the method 200 continues to 212.

At 212, the controller 144 begins executing the shift of the transmission 124, which includes controlling applied torque/pressure to at least some of the plurality of clutches 132 to disengage a current gear 128 and to engage a new/desired gear 132. This shift operation also includes controlling the torque generating system 116 to generate a desired output (torque/speed) for an improved (e.g., synchronized) shift operation. During the shift operation, at 216, the controller 144 determines measured accelerations of (i) the output shaft 120 of the torque generating system 116 (or the input shaft 136 of the transmission 124) and (ii) the output shaft 140 of the transmission 124. At 220, the controller 144 applies the discriminatory formula (12) derived above to determine engine/motor torque error (from the torque generating system 116) and clutch torque error (from the transmission 124). At 224, the controller 144 controls the transmission 124 and, more particularly, the hydraulic actuation of the clutches 132, to compensate for the determined engine/motor torque error or the clutch torque error, thereby providing a smoother shift operation of the transmission 124. Compared to the conventional solutions, which could potentially incorrectly adjust clutch torque/pressure when the actual error is due to the engine/motor torque, this could result in a substantially higher quality shift operation of the transmission 124. The method 200 then ends or returns to 204 for one or more additional cycles.

It will be appreciated that the term "controller" as used herein refers to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A control system for a transmission of a vehicle, the control system comprising:
   a first output shaft speed sensor configured to measure a rotational speed of an output shaft of a torque generating system of the vehicle, the output shaft of the torque generating system being coupled to an input shaft of the transmission;
   a second output shaft speed sensor configured to measure a rotational speed of an output shaft of the transmission, the transmission including a plurality of gears and a plurality of hydraulically-actuated clutches; and
   a controller configured to initiate a shift operation of the transmission where at least some of the plurality of clutches are actuated to disengage a current gear and to engage a new desired gear of the plurality of transmission gears and, during the transmission shift operation:

determine accelerations of (i) the torque generating system output shaft and (ii) the transmission output shaft based on the respective measured rotational speeds;

identify an error source using a transmission model that maps differences between the determined and target accelerations back to torque generating system error and/or transmission clutch torque error; and based on the identified error source, adjust the actuation of at least some of the plurality of clutches to compensate for the torque generating system error and/or transmission clutch torque error to mitigate or eliminate noise/vibration/harshness (NVH) caused by the transmission shift operation.

2. The control system of claim 1, wherein the transmission model defines linear algebra that relates determined acceleration error back to the torque generating system and/or one or more of the plurality of transmission clutches.

3. The control system of claim 1, wherein the transmission model is based on a simple planetary gearset with fixed gear plane connections and a set of speed constraints.

4. The control system of claim 3, wherein the transmission model defines the following to discriminate between torque generating system error ($\Delta\tau_{IN}$) and transmission clutch torque error ($\Delta\tau_C$):

$$\begin{bmatrix} \Delta\tau_{IN} \\ \Delta\tau_C \end{bmatrix} = \begin{bmatrix} \frac{\partial a_{IN}}{\partial \tau_{IN}} & \frac{\partial a_{IN}}{\partial \tau_C} \\ \frac{\partial a_{OUT}}{\partial \tau_{IN}} & \frac{\partial a_{OUT}}{\partial \tau_C} \end{bmatrix}^{-1} \cdot \begin{bmatrix} \Delta a_{IN} \\ \Delta a_{OUT} \end{bmatrix},$$

where $a_{IN}$ and $a_{OUT}$ are the transmission input/output shaft accelerations.

5. The control system of claim 4, wherein the controller is configured to determine the accelerations using third-order Kalman filtering of the measured rotational speeds of (i) the torque generating system output shaft and (ii) the transmission output shaft.

6. The control system of claim 5, wherein the determined accelerations $a_{IN}^*$ and $a_{OUT}^*$ are defined as follows:

$$a_{IN}^* = \frac{\partial a_{IN}}{\partial \tau_{IN}} \cdot \tau_{IN}^* + \frac{\partial a_{IN}}{\partial \tau_C} \cdot \tau_C^* + \frac{\partial a_{IN}}{\partial \tau_{OUT}} \cdot \tau_{OUT}^*,$$

$$\text{and } a_{OUT}^* = \frac{\partial a_{OUT}}{\partial \tau_{IN}} \cdot \tau_{IN}^* + \frac{\partial a_{OUT}}{\partial \tau_C} \cdot \tau_C^* + \frac{\partial a_{OUT}}{\partial \tau_{OUT}} \cdot \tau_{OUT}^*.$$

7. The control system of claim 1, wherein the controller does not assume that the error source is the transmission and incorrectly adjust clutch torque/pressure in response thereto.

8. A control method for a transmission of a vehicle, the control method comprising:

initiating, by a controller of the transmission of the vehicle, a shift operation of the transmission where at least some of a plurality of clutches of the transmission are actuated to disengage a current gear of a plurality of gears of the transmission and to engage a new desired gear of the plurality of gears; and during the transmission shift operation:

determining, by the controller and using a first speed sensor, an acceleration of an output shaft of a torque generating system that is coupled to an input shaft of the transmission based on a measured rotational speed of the torque generating system output shaft by the first speed sensor;

determining, by the controller and using a second speed sensor, an acceleration of an output shaft of the transmission based on a measured rotational speed of the transmission output shaft by the second speed sensor;

identifying, by the controller, an error source using a transmission model that maps differences between the determined and target accelerations back to torque generating system error and/or transmission clutch torque error; and based on the identified error source, adjusting, by the controller, the actuation of at least some of the plurality of clutches to compensate for the torque generating system error and/or transmission clutch torque error to mitigate or eliminate noise/vibration/harshness (NVH) caused by the transmission shift operation.

9. The control method of claim 8, wherein the transmission model defines linear algebra that relates determined acceleration error back to the torque generating system and/or one or more of the plurality of transmission clutches.

10. The control method of claim 8, wherein the transmission model is based on a simple planetary gearset with fixed gear plane connections and a set of speed constraints.

11. The control method of claim 10, wherein the transmission model defines the following to discriminate between torque generating system error ($\Delta\tau_{IN}$) and transmission clutch torque error ($\Delta\tau_C$):

$$\begin{bmatrix} \Delta\tau_{IN} \\ \Delta\tau_C \end{bmatrix} = \begin{bmatrix} \frac{\partial a_{IN}}{\partial \tau_{IN}} & \frac{\partial a_{IN}}{\partial \tau_C} \\ \frac{\partial a_{OUT}}{\partial \tau_{IN}} & \frac{\partial a_{OUT}}{\partial \tau_C} \end{bmatrix}^{-1} \cdot \begin{bmatrix} \Delta a_{IN} \\ \Delta a_{OUT} \end{bmatrix},$$

where $a_{IN}$ and $a_{OUT}$ are the transmission input/output shaft accelerations.

12. The control method of claim 11, wherein determining the accelerations comprises determining, by the controller, the accelerations using third-order Kalman filtering of the measured rotational speeds of (i) the torque generating system output shaft and (ii) the transmission output shaft.

13. The control method of claim 12, wherein the determined accelerations $a_{IN}^*$ and $a_{OUT}^*$ are defined as follows:

$$a_{IN}^* = \frac{\partial a_{IN}}{\partial \tau_{IN}} \cdot \tau_{IN}^* + \frac{\partial a_{IN}}{\partial \tau_C} \cdot \tau_C^* + \frac{\partial a_{IN}}{\partial \tau_{OUT}} \cdot \tau_{OUT}^*,$$

$$\text{and } a_{OUT}^* = \frac{\partial a_{OUT}}{\partial \tau_{IN}} \cdot \tau_{IN}^* + \frac{\partial a_{OUT}}{\partial \tau_C} \cdot \tau_C^* + \frac{\partial a_{OUT}}{\partial \tau_{OUT}} \cdot \tau_{OUT}^*.$$

14. The control method of claim 8, wherein the controller does not assume that the error source is the transmission and incorrectly adjust clutch torque/pressure in response thereto.

* * * * *